United States Patent
Caspar et al.

(10) Patent No.: US 7,234,398 B2
(45) Date of Patent: Jun. 26, 2007

(54) PLANARIZING ELEMENT FOR THERMAL PRINTING OF COLOR FILTER

(75) Inventors: Jonathan V. Caspar, Henry Clay Village, DE (US); Gerald D. Andrews, Hockessin, DE (US); Jeffrey S. Meth, Landenberg, PA (US); Gregory C. Weed, Towanda, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 216 days.

(21) Appl. No.: 10/511,854

(22) PCT Filed: Jan. 21, 2003

(86) PCT No.: PCT/US03/02060

§ 371 (c)(1),
(2), (4) Date: Oct. 14, 2004

(87) PCT Pub. No.: WO03/099575

PCT Pub. Date: Dec. 4, 2003

(65) Prior Publication Data

US 2005/0238968 A1 Oct. 27, 2005

(51) Int. Cl.
*B41F 33/00* (2006.01)
(52) U.S. Cl. ........................ 101/483; 101/488
(58) Field of Classification Search ........... 101/483, 101/487, 488; 430/200, 201, 275.1, 7, 11, 430/276.1
See application file for complete search history.

(56) References Cited

U.S. PATENT DOCUMENTS

| | | | |
|---|---|---|---|
| 3,684,771 A | 8/1972 | Braun | |
| 3,788,996 A | 1/1974 | Thompson | |
| 4,032,698 A | 6/1977 | Ashe | |
| 4,070,388 A | 1/1978 | Jones | |
| 4,643,917 A | 2/1987 | Koshizuka et al. | |
| 4,912,019 A | 3/1990 | Nebe et al. | |
| 4,942,141 A | 7/1990 | Deboer et al. | |
| 4,948,776 A | 8/1990 | Evans et al. | |
| 5,019,549 A | 5/1991 | Kellogg et al. | |
| 5,112,904 A * | 5/1992 | Feith | 525/59 |
| 5,155,005 A * | 10/1992 | Sato et al. | 430/257 |
| 5,156,938 A | 10/1992 | Foley et al. | |
| 5,171,650 A | 12/1992 | Ellis | |
| 5,231,131 A | 7/1993 | Chu et al. | |
| 5,256,506 A | 10/1993 | Ellis et al. | |

(Continued)

FOREIGN PATENT DOCUMENTS

EP 1 138 731 A1 10/2001

(Continued)

OTHER PUBLICATIONS

PCT International Search Report Dated Jun. 20, 2003, International Appln. No. PCT/US03/02060. International Filing Date—Jan. 1, 2003, pp. 7.

*Primary Examiner*—Anthony H. Nguyen
(74) *Attorney, Agent, or Firm*—Thomas H. Magee

(57) ABSTRACT

A planarizing element is described for use in a thermal imaging process. The planarizing element includes a support; a planarizing layer comprising a crosslinkable binder having a weight average molecular weight of about 20,000 to about 110,000.

21 Claims, 4 Drawing Sheets

U.S. PATENT DOCUMENTS

| | | | |
|---|---|---|---|
| 5,324,879 A | 6/1994 | Hawthorne | |
| 5,334,573 A | 8/1994 | Schild | |
| 5,362,826 A | 11/1994 | Berge et al. | |
| 5,427,847 A | 6/1995 | Zawada | |
| 5,468,597 A * | 11/1995 | Calabrese et al. | 430/315 |
| 5,523,192 A | 6/1996 | Blanchet-Fincher | |
| 5,534,387 A | 7/1996 | Bodager et al. | |
| 5,540,147 A * | 7/1996 | Johnson | 101/211 |
| 5,563,019 A | 10/1996 | Blanchet-Fincher | |
| 5,565,301 A | 10/1996 | Bodager | |
| 5,593,808 A | 1/1997 | Ellis | |
| 5,622,795 A | 4/1997 | Ellis | |
| 5,681,681 A | 10/1997 | Ellis | |
| 5,773,188 A | 6/1998 | Ellis | |
| 5,773,534 A | 6/1998 | Antonelli et al. | |
| 5,922,469 A * | 7/1999 | Wunsch et al. | 428/425.9 |
| 6,020,416 A | 2/2000 | Mazur et al. | |
| 6,051,318 A | 4/2000 | Kwon | |
| 6,143,451 A | 11/2000 | Blanchet-Fincher | |
| 6,146,792 A * | 11/2000 | Blanchet-Fincher et al. | 430/7 |
| 6,200,666 B1 * | 3/2001 | Christian et al. | 428/195.1 |
| 6,921,614 B2 * | 7/2005 | Andrews et al. | 430/18 |
| 2001/0010884 A1 | 8/2001 | Guehler et al. | |

FOREIGN PATENT DOCUMENTS

| | | |
|---|---|---|
| EP | 1 176 028 A1 | 1/2002 |
| GB | 1339930 A | 12/1973 |
| GB | 2083726 | 3/1982 |
| WO | WO 01/87634 A2 | 11/2001 |
| WO | WO 01/96116 A1 | 12/2001 |

* cited by examiner

PLANARIZING ELEMENT FOR THERMAL PRINTING OF COLOR FILTER

FIELD OF THE INVENTION

This invention relates to improved products and processes for effecting laser-induced thermal transfer imaging in the formation of color filters. The invention is of particular utility in the formation of color filters in high resolution liquid crystal displays.

BACKGROUND OF THE INVENTION

Liquid crystal display (LCD) devices have become increasingly important in displays that require very low consumption of electrical power or where the environment dictates a lightweight, planar, flat surface. For example, LCDs are used in display devices such as wristwatches, pocket and personal computers, flat panel television displays and aircraft cockpit displays. When there is a need to incorporate a color display capability into such display devices, a component called a color filter is used. For the device to have color capability, each LCD pixel is aligned with a color area, typically red, green, or blue, of a color filter array. Depending upon the image to be displayed, one or more of the pixel electrodes is energized during display operation to allow full light, no light, or partial light to be transmitted through the color filter area associated with that pixel. The image perceived by a user is a blend of colors formed by the transmission of light through adjacent color filter areas.

A major contributor to the cost of color LCDs is the color filter. Four color filter manufacturing methods are known in the art, viz., dye gelatin, pigmented photoresist, electrodeposition and printing. The pigmented photoresist method offers the best trade-off of degradation resistance, optical properties, and flexibility along with high resolution, and is generally preferred. While conventional photolithographic materials and methods may be employed in the photoresist method, it suffers from the high cost and inconvenience associated with numerous process steps, some involving wet chemistry.

Laser-induced thermal transfer processes are well-known in applications such as color proofing and lithography and have been described in, for example, Baldock, U.K. Patent 2,083,726; DeBoer, U.S. Pat. No. 4,942,141; Kellogg, U.S. Pat. No. 5,019,549; Evans, U.S. Pat. No. 4,948,776; Foley et al., U.S. Pat. No. 5,156,938; Ellis et al., U.S. Pat. No. 5,171,650; and Koshizuka et al., U.S. Pat. No. 4,643,917.

As is known in the art, laser-induced processes use a laserable assemblage comprising (a) a donor element containing the material to be transferred in contact with (b) a receiver element. The laserable assemblage is exposed to a laser, usually a suitable spatially modulated near-infrared laser, resulting in transfer of material from the donor element to the receiver element. To form an image, exposure takes place over a small region of the laserable assemblage at any one time, so that transfer of material from the donor element to the receiver element can be built up one pixel at a time. In this context the term pixel indicates the minimum addressable writing area of the laser exposure system. This laser addressable pixel size is generally smaller than the LCD color pixel size described above. Computer control of the writing laser produces transfer with high resolution and at high speed. The laserable assemblage, upon imagewise exposure to a laser as described supra, is henceforth termed an imaged laserable assemblage.

For the preparation of images for proofing applications and in photomask fabrication, the colorant comprises a pigment or a dye. For the preparation of lithographic printing plates, the colorant comprises an oleophilic material that will receive and transfer ink in printing.

Laser-induced processes are fast and result in transfer of material with high resolution. However, in many cases, the resulting transferred material does not have the required durability. In dye sublimation processes, light-fastness is frequently lacking. In ablative and melt transfer processes, poor adhesion and/or durability can be a problem. In U.S. Pat. Nos. 5,563,019 and 5,523,192, improved multilayer laserable assemblages and associated processes are disclosed that do afford improved adhesion and/or durability of the transferred images. In U.S. Pat. No. 6,051,318 an improved donor film for use in the production of color filters is disclosed. U.S. Pat. No. 6,143,451 discloses a laser-induced thermal image transfer imaging process characterized by the use of an ejection layer that affords advantages in the final imaged product.

As is known in the art, the thermally imageable layer in a laserable assemblage always contains some sort of binder, generally a polymeric binder. The binder serves to hold together the colorant and any adjuvants thereto before, during and after the image transfer process is effected, forming a single cohesive, homogeneous mass. It is found that the physical properties of the binder have significant effect on the properties of the transferred image. In particular, it has been found in the practice of the art that binders characterized by glass transition temperatures near or below room temperature provide good toughness and durability with superior adhesive properties, but often at the expense of resolution. On the other hand, binders characterized by glass transition temperatures well above room temperature provide superior resolution but at the expense of toughness, durability, and adhesion. Practical application of laser-induced thermal image transfer to high resolution applications such as color filter formation requires toughness and adhesion sufficient to permit survival of the transferred image during the remainder of the manufacturing process. The resolution requirements for the color filter application are extremely demanding, and little trade-off can be made while preserving utility in the application.

Aqueous blends of colloidally dispersed polymers for use in making organic coatings which are hard and ductile at ambient temperature and which remain stiff and elastic at elevated temperature are disclosed in Mazur et al, U.S. Pat. No. 6,020,416. The combination of properties is attributed to the use of blends of high molecular weight polymers differing in glass transition temperature.

A need exists for stable crosslinked pigmented images on a substrate wherein the surface of the image away from the substrate is an extremely smooth surface.

SUMMARY OF THE INVENTION

Improved products and processes for laser induced thermal imaging are disclosed herein.

In a first aspect, this invention provides a planarizing element comprising a planarizing layer, wherein the planarizing layer comprises a crosslinkable binder, and wherein the crosslinkable binder has a weight average molecular weight of about 20,000 to about 110,000. More typically, the crosslinkable binder has a weight average molecular weight of about 30,000 to about 100,000, and still more typically about 50,000 to about 85,000.

In a second aspect, the invention provides a method for making a color image comprising: (1) imagewise exposing to laser radiation a laserable assemblage comprising: (A) a donor element comprising a thermally imageable layer, and (B) a receiver element comprising: (a) a receiver support; and (b) an image receiving layer provided on the surface of the receiver support; whereby the exposed areas of the thermally imageable layer are transferred to the receiver element to form a colorant-containing image on the image receiving layer; and (2) separating the donor element (A) from the receiver element (B), thereby revealing the colorant-containing image on the image receiving layer of the receiver element; (3) optionally applying, typically laminating, the colorant-containing image on the image receiving layer of the receiver element to a permanent substrate, and removing the receiver support to transfer the colorant-containing image on the image receiving layer to the permanent substrate, and (4) applying a planarizing element comprising a support and a planarizing layer to the colorant-containing image, and removing the support, wherein the planarizing layer is adjacent the colorant-containing image, and wherein the planarizing layer comprises a crosslinkable binder having a weight average molecular weight of about 20,000 to about 110,000. More typically, the crosslinkable binder has a weight average molecular weight of about 30,000 to about 100,000, and still more typically about 50,000 to about 85,000.

In the second aspect, the receiver support or the permanent substrate may be made of a transparent material such as glass or a rigid plastic such as polycarbonate. When step (3) is optional, the receiver support is a transparent material. Alternately, the thermally imageable layer, the image receiving layer, or both may comprises a crosslinkable binder having a number average molecular weight of about 1,500 to about 70,000, more typically about 5,000 to about 10,000, and most typically 10,000 to about 70,000.

In a third aspect, the invention provides a method for making a color image comprising:

(1) imagewise exposing to laser radiation a laserable assemblage comprising: (A) a donor element having a thermally imageable layer, and (B) a permanent substrate; whereby the exposed areas of the thermally imageable layer are transferred to the permanent substrate to form a colorant-containing image on the permanent substrate; (2) separating the donor element (A) from the permanent substrate (B), thereby revealing the colorant-containing image on the permanent substrate; and (3) applying a planarizing element comprising a support and a planarizing layer to the colorant-containing image, and removing the support, wherein the planarizing layer is adjacent the colorant-containing image, and wherein the planarizing layer comprises a crosslinkable binder having a weight average molecular weight of about 20,000 to about 110,000. The permanent substrate may be glass or treated glass. Alternately, the permanent substrate may be a rigid plastic, e.g. polycarbonate, or treated rigid plastic. More typically, the crosslinkable binder has a weight average molecular weight of about 30,000 to about 100,000, and still more typically about 50,000 to about 85,000.

In a fourth aspect, the invention provides a color liquid crystal display comprising a color filter, wherein the color filter is prepared using a thermal imaging process, and a planarizing element comprising a planarizing layer having a crosslinkable binder having a weight average molecular weight of about 20,000 to about 110,000. More typically, the crosslinkable binder has a weight average molecular weight of about 30,000 to about 100,000, and still more typically about 50,000 to about 85,000.

DETAILED DESCRIPTION OF THE INVENTION

Figure 1:
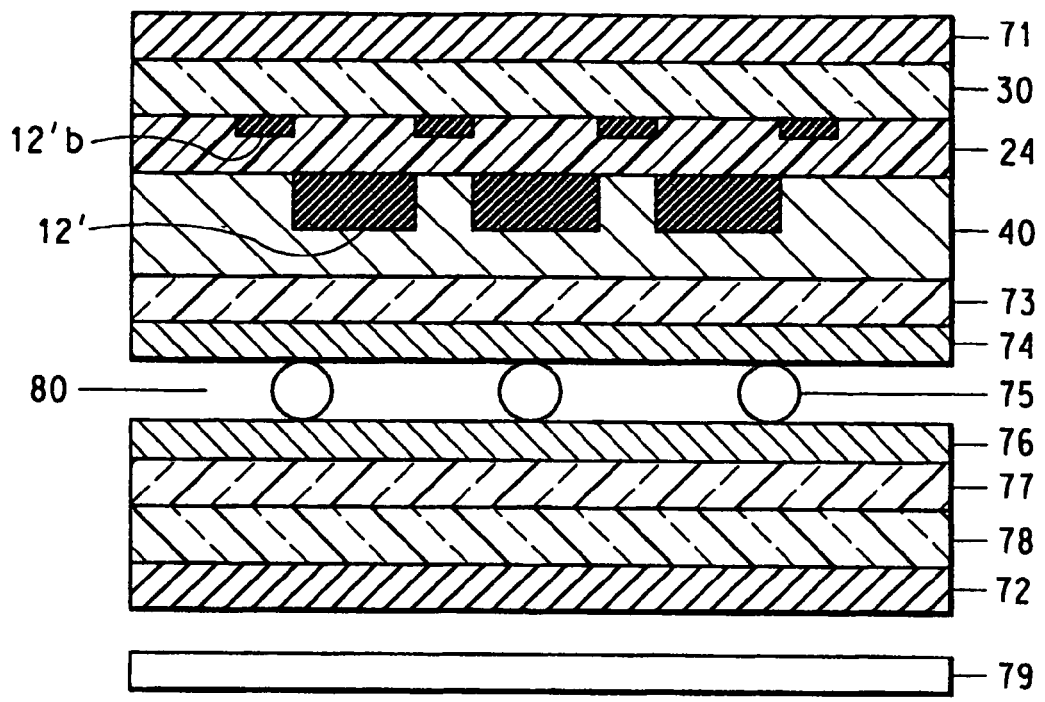
FIG. 1 is a schematic cross sectional view of an LCD display incorporating the color filter of this invention.

In accordance with the present invention, a color filter is prepared by a thermal transfer process, and then overlaid with additional layers to form a liquid crystal display. An assemblage is provided comprising a donor element and a receiver element. Planarizing elements may be used in forming the color filter.

Planarizing Element

The planarizing element comprises a support and a planarizing layer.

Planarizing Support

The support of the planarizing element is a dimensionally stable sheet material. Typically, the planarizing element is flexible to facilitate subsequent processing steps, as described further, below. Examples of transparent, flexible films appropriate for use as the support include, for example, polyethylene terephthalate ("polyester"), polyether sulfone, polyimides, poly(vinyl alcohol-co-acetal), polyolefins, or cellulose esters, such as cellulose acetate, and polyvinyl chloride. Typically, the support of the planarizing element is polyethylene terephthalate that may optionally been plasma treated. Other materials can be present as additives in the support, as long as they do not interfere with the essential function of the support. Examples of such additives include plasticizers, coating aids, flow additives, slip agents, antihalation agents, antistatic agents, surfactants, and others which are known for use in the formulation of films. The support generally has a thickness in the range of 25-200 microns, preferably 75-125 microns.

Planarizing Layer

The planarization layer (40) protects the underlying color filter element and smoothes and/or levels the surface. Materials useful as planarization layers comprise a low molecular weight crosslinkable binder having a weight average molecular weight of about 20,000 to about 110,000. More typically, the crosslinkable binder has a weight average molecular weight of about 30,000 to about 100,000, and still more typically about 50,000 to about 85,000. The binders may be film forming and coatable from solution or from a dispersion. Binders having glass transition temperatures below about 110° C. are preferred.

Process steps used to convert color filters into LCD panels often involve contact of the color filter with organic solvents such as N-methylpyrrolidinone, γ-butyrolactone, acetone, isopropanol, etc. Since these solvents swell, or even dissolve, the low molecular weight binder resins used in the planarizing layer (40), some form of crosslinking capability must be provided.

Some suitable pairs of functional groups for such crosslinking reactions include: hydroxyl and isocyanate; hydroxyl and carboxyl; hydroxyl and melamine-formaldehyde; carboxyl and melamine-formaldehyde; carboxyl and amine; carboxyl and epoxy, epoxy and amine; and carboxylic anhydride and amine. The pairs of crosslinking functional groups can be utilized in several ways. One crosslinking functional group can be incorporated into the binder polymer backbone, and the other added as a polyfunctional low molecular weight crosslinking agent. One crosslinking functional group can be incorporated into the binder polymer backbone, and the other incorporated into a different binder polymer backbone. Both of the crosslinking functional groups can be incorporated into the same binder polymer backbone.

Another crosslinking reaction involves one or more of the polymeric binders having pendant groups that are capable of undergoing free-radical induced or cationic crosslinking reactions. Pendant groups which are capable of undergoing free-radical induced crosslinking reactions are generally those which contain sites of ethylenic unsaturation, such as mono- and poly-unsaturated alkyl groups; acrylic and methacrylic acids and esters. In some cases, the pendant crosslinking group can be photosensitive, as is the case with pendant cinnamoyl or N-alkyl stilbazolium groups. Pendant groups which are capable of undergoing cationic crosslinking reactions include substituted and unsubstituted epoxide and aziridine groups.

Additional components may include the coating aids, UV stabilizers, UV-filters, UV absorbers, small molecule crosslinking aids, plasticizers, flow additives, adhesion promoters, antistatic agents, surfactants, and others which are known for use in the formulation of films, with the proviso they are colorless. Small molecule crosslinking aids such as multifunctional acids in conjunction with epoxy containing latexes may be used.

Donor Element

Figure 2:
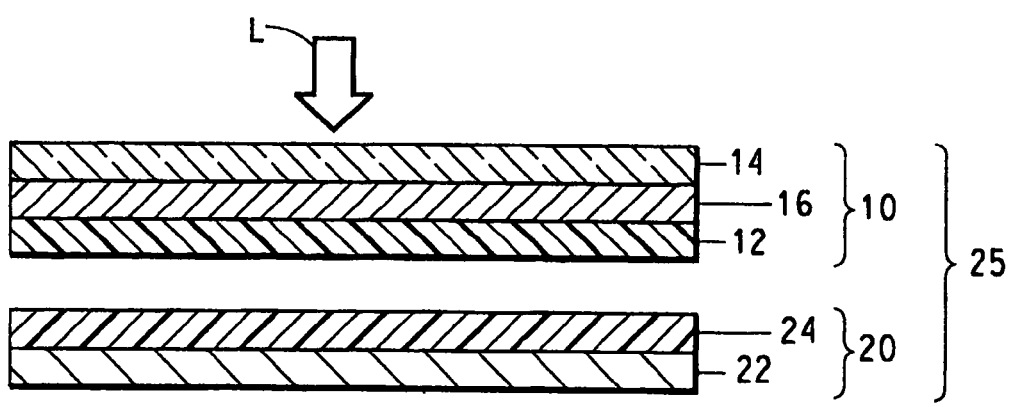
FIG. 2 is a simplified schematic diagram of an assemblage comprising a donor element and a receiver element for use in the thermally imaging process of the invention.

The donor element (10) comprises a thermally imageable layer (12) comprising at least one crosslinkable polymeric binder and a first colorant, and a base element. The base element comprises a base support (14) and an optional heating layer (16) between the base support (14) and the thermally imageable layer (12). As best seen in FIG. 2, the base support (14) provides support for the heating layer (16), if present, and the thermally imageable layer (12). Optionally, an ejection layer (not shown) may be present in the donor element.

Base Support

The base support (14) of the donor element (10) is a dimensionally stable sheet material. Typically, the donor element (10) is flexible to facilitate subsequent processing steps, as described further, below. The base support (14) is transparent to laser radiation to allow for exposure of the thermally imageable layer (12), as described further, below.

Examples of transparent, flexible films appropriate for use as the base support (14) include, for example, polyethylene terephthalate ("polyester"), polyether sulfone, polyimides, poly(vinyl alcohol-co-acetal), polyethylenes, or cellulose esters, such as cellulose acetate, and polyvinyl chloride. Typically, the base support (14) of the donor element (10) is polyethylene terephthalate that has been plasma treated to accept the optional heating layer (16). Other materials can be present as additives in the base support, as long as they do not interfere with the essential function of the support. Examples of such additives include plasticizers, coating aids, flow additives, slip agents, antihalation agents, antistatic agents, surfactants, and others which are known for use in the formulation of films. The base support generally has a thickness in the range of 25-200 microns, preferably 38-102 microns.

Heating Layer

As best seen in FIG. 2, the function of the optional heating layer (16) of the donor element (10) is to absorb the laser radiation (L) used to expose the thermally imageable layer (12) and to convert the radiation into heat. The heating layer is typically a metal.

Some examples of other suitable materials are transition metal elements and metallic elements of Groups 13, 14, 15 and 16, their alloys with each other, and their alloys with the elements of Groups 1 and 2, which have less adhesion to the thermally imageable layer (12), or may be treated to have less adhesion, than the adhesion of the thermally imageable layer (12) to the receiving surface of the substrate (24) and absorb the wavelength of the laser. The IUPAC numbering system is used throughout, where the groups are numbered from left to right as 1-18 (CRC Handbook of Chemistry and Physics, $81^{st}$ Edition, 2000). Tungsten (W) is an example of a suitable transition metal.

Carbon, a Group 14, nonmetallic element, may also be used.

Nickel, aluminum, chromium and nickel vanadium alloys are typical metals for the heating layer (16). Chromium applied by sputtering is the most typical choice for the heating layer.

Alternatively, in FIG. 2, the optional heating layer (16) can be an organic layer comprising an organic binder and an infrared absorber. Some examples of suitable binders include polyvinyl chloride, chlorinated polyvinyl chloride and nitrocellulose. Examples of near infrared absorbers are carbon black and infrared dyes. Polymers with higher decomposition temperatures may also be employed in fabricating organic heating layers.

The thickness of the heating layer (16) depends on the optical absorption of the metals used. The most preferred metallization is such as to give 50% optical transmission at 830 nm, with a preferred range from 25% to 60% T.

Although it is preferred to have a single optional heating layer, it is also possible to have more than one heating layer, and the different layers can have the same or different compositions.

The optional heating layer (16) may be applied to the base support (14) by a physical vapor deposition technique. The term "physical vapor deposition" refers to various deposition approaches carried out in vacuum. Thus, for example, physical vapor deposition includes all forms of sputtering, including ion beam sputtering, as well as all forms of vapor deposition, such as electron beam evaporation and chemical vapor deposition. A specific form of physical vapor deposition useful in the present invention is RF magnetron sputtering. Nickel may be electron beam deposited onto the base support (14). Aluminum may be applied by resistive heating. Chromium, nickel and nickel vanadium layers may be applied by either sputtering or electron beam deposition. In the case of optional heating layers comprised of organic layers, the heating layer may be applied by conventional solvent coating techniques.

Thermally Imageable Layer

In a first embodiment, the thermally imageable layer of the present invention may comprise (a) two or more polymeric binders at least one pair of which said binders differ in glass transition temperature ($T_g$) by at least 20 centigrade degrees, and (b) a colorant. Preferably the binders differ in $T_g$ by at least 40 centigrade degrees. Most preferably the binders differ in $T_g$ by at least 80 centigrade degrees.

The higher $T_g$ binder of the pair exhibits a $T_g$ of between 20 and 140 centigrade degrees higher than the $T_g$ of the lower $T_g$ binder in the pair. The $T_g$ of the higher $T_g$ binder in the pair ranges from 70° C. to 140° C. The $T_g$ of the lower $T_g$ binder of the pair ranges from –40° C. to 60° C. Preferably the $T_g$ of the higher $T_g$ binder of the pair ranges from 100° C. to 140° C. Preferably the $T_g$ of the lower $T_g$ binder of the pair ranges from –40° C. to 0° C.

The polymeric binder suitable for use in the present invention preferably does not self-oxidize, decompose or degrade at the temperatures to which it exposed during the laser exposure so that the colorant and binder are transferred with little or no degradation. Binder polymers suitable for use as the high $T_g$ component of the pair include, but are not limited to, polystyrene and copolymers thereof, acrylates, methacrylates and co-polymers thereof. Binder polymers suitable for use as the low $T_g$ component of the pair include but are not limited to butyl acrylates and co-polymers thereof. The monomer units present in the polymeric binders suitable for use in the present invention may be substituted or unsubstituted. Mixtures of polymers can also be used.

In a preferred embodiment, 1-5 mol-% of crosslinkable monomers are incorporated into the polymeric binders of the instant invention. After crosslinking, the binders exhibit resistance to the temperatures and solvents employed in the formation of color filter arrays in liquid crystal display devices, making this embodiment highly preferred in that application. Suitable crosslinkable comonomers include but are not limited to methacrylic acid and glycidyl methacrylate.

The polymeric binders suitable for use in the present invention are present at a concentration of about 15-50% by weight, preferably 30-40% by weight, based on the total weight of the thermally imageable layer. The weight ratio of higher $T_g$ binder to lower $T_g$ binder should be in the range of 60:40 to 95:5, preferably in the range of 75:25 to 92:8.

The binders suitable for use in the present invention are synthesized preferably in the form of latex dispersions, as described in Mazur et al. U.S. Pat. No. 6,020,416, incorporated herein by reference to the entirety, and as hereinbelow exemplified. The synthesis of polymer latexes is a very well-known art in widespread commercial use.

In a preferred embodiment, one or more of the polymeric binders comprise monomer units having pendant groups that are capable of undergoing free-radical induced or cationic crosslinking reactions. Pendant groups which are capable of undergoing free-radical induced crosslinking reactions are generally those which contain sites of ethylenic unsaturation, such as mono- and polyunsaturated alkyl groups; acrylic and methacrylic acids and esters. In some cases, the pendant crosslinking group can be photosensitive, as is the case with pendant cinnamoyl or N-alkyl stilbazolium groups. Pendant groups which are capable of undergoing cationic crosslinking reactions include substituted and unsubstituted epoxide and aziridine groups.

Crosslinkable binders suitable for the practice of the invention can be formed by direct copolymerization of one or more ethylenically unsaturated dicarboxylic acid anhydrides, or the corresponding alkyl diesters, with one or more of the above comonomers. Suitable ethylenically unsaturated dicarboxylic acid anhydrides are, for example, maleic anhydride, itaconic acid anhydride and citraconic acid anhydride and alkyl diesters such as the diisobutyl ester of maleic anhydride. The copolymer binder containing acid anhydride functionality can be reacted with primary aliphatic or aromatic amines.

Alternately, the thermally imageable layer may comprise a low molecular weight crosslinkable binder having a number average molecular weight of about 1,500 to about 70,000.

The total binder concentration is generally in the range of about 15-50% by weight, based on the total weight of the thermally imageable layer, preferably 30-40% by weight.

The colorant in the thermally imageable layer may be a pigment dispersion or a non-sublimable dye. As is well known in the art, the introduction of pigments into the film compositions is most readily accomplished by employing pigment dispersants to prepare stable pigment dispersions. It is preferred to use a pigment as the colorant for stability and for color density, and also for the high decomposition temperature. The pigment is preferably chosen from pigments having (1) high transparency, and (2) small particle size, wherein the average particle size is less than about 100 nanometers. Some useful chemical classes of pigments include metal-containing phthalocyanines and halogenated derivatives, anthraquinones, pyrazolones, acetoacetyl monoazo, bisazo, and methine. Some examples of transparent pigments that can be used in this invention include RS Magenta 234-007™, GS Cyan 249-0592™, and RS Cyan 248-061, from Sun Chemical Co. (Fort Lee, N.J.); BS Magenta RT-333D , Microlith Yellow 3G-WA™, Microlith Yellow 2R-WA™, Microlith Blue YG-WAT™, Microlith Black C-WA™, Microlith Violet RL-WA™, Microlith Red RBS-WA™, Cromophthal Red 3B, Irgalite Blue GLO, and Irgalite Green 6G, from Ciba (Newport, Del.); Fanchon Fast Yellow 5700, from Bayer (Pittsburgh, Pa.); any of the Heucotech Aquis II™ series; any of the Heucosperse Aquis III™ series; and the like.

The amount of colorant present in the thermally imageable layer is chosen such that transmission optical densities of the final color filter image prepared upon the permanent substrate satisfactorily reproduces the required color gamut for the LCD display which will be constructed using the color filter. The color gamut for LCD displays is typically described using CIE chromaticity coordinates x, y and Y. While not intended to be limiting, typical donor element transmission optical densities are in the range from about 1.0 and about 2.5 for red, blue and green at the visible wavelength absorption maxima of the pigments, and between about 3.0 and about 4.0 for black at 550 nm. In general, the colorant is present in an amount of from about 20 to about 80% by weight, typically about 30 to about 50% by weight, based on the total weight of the transfer coating.

A dispersant is usually present when a pigment is to be transferred, in order to achieve maximum color strength, transparency and gloss. The dispersant is generally an organic polymeric compound and is used to separate the fine pigment particles and avoid flocculation and agglomeration. A wide range of dispersants is commercially available. A dispersant will be selected according to the characteristics of the pigment surface and other components in the composition as practiced by those skilled in the art. However, one class of dispersant suitable for practicing the invention is that of the AB dispersants. The A segment of the dispersant adsorbs onto the surface of the pigment. The B segment extends into the solvent into which the pigment is dispersed. The B segment provides a barrier between pigment particles to counteract the attractive forces of the particles, and thus to prevent agglomeration. The B segment should have good compatibility with the solvent used. The AB dispersants of choice are generally described in "Use of AB Block Polymers as Dispersants for Non-aqueous Coating Systems", by H. C. Jakubauskas, *Journal of Coating Technology*, Vol. 58, No. 736, pages 71-82. Suitable AB dispersants are also disclosed in U.K. Patent 1,339,930 and U.S. Pat. Nos. 3,684,771; 3,788,996; 4,070,388; 4,912,019; and 4,032,698. Other types of dispersants include graft copolymer dispersants, and random copolymer dispersants. Conventional pigment dispersing techniques, such as roll milling, media milling, ball milling, sand milling, etc., can be employed. For color filter applications, the binder polymer of the thermally imageable layer can also act as a dispersant for the pigment.

Other materials can be present as additives in the thermally imageable layer as long as they do not interfere with the essential function of the layer. Some examples of such additives include coating aids, plasticizers, flow additives, slip agents, antihalation agents, antistatic agents, surfactants, and others that are known for use in the formulation of coatings. However, it is preferred to minimize the amount of additional materials in this layer, as they may deleteriously affect the final product after transfer to the final support.

The thermally imageable layer generally has a thickness in the range of about 0.1 to 5 microns, preferably in the range of about 0.1 to 1.5 microns. Thicknesses greater than about 5 microns are generally not preferred as they require excessive energy in order to be effectively transferred to the receiver and generally give poorly resolved images.

Although it is typical to have a single thermally imageable layer, it is also possible to have more than one thermally imageable layer, and the different layers can have the same or different compositions, as long as they all function as described above. The total thickness of the combined thermally imageable layers should be in the range given above.

The thermally imageable layer(s) can be coated onto the heating layer of the donor, if present, or directly on a support as a dispersion or a solution in a suitable solvent. Any suitable solvent can be used as a coating solvent, as long as it does not deleteriously affect the properties of the assemblage, using conventional coating techniques or printing techniques, for example, gravure printing or slot dye coating.

Additional Layers

An ejection layer (not shown) may optionally be provided between the optional heating layer (16) and the thermally imageable layer (12), as is known in the art. The ejection layer decomposes into gaseous molecules when heated, providing additional force to cause transfer of exposed portions of the thermally imageable layer (12) to the receiver element (20). A polymer having a relatively low decomposition temperature (less than about 350° C., preferably less than about 325° C., and more preferably less than about 280° C.) may be used. In the case of polymers having more than one decomposition temperature, the first decomposition temperature should be lower than 350° C. Suitable ejection layers are disclosed in U.S. Pat. No. 5,766,819, assigned to the assignee of the present invention. Thermal additives may also be provided in the ejection layer to amplify the effect of the heat generated in the heating layer (16), as is known in the art and also described in U.S. Pat. No. 5,766,819. U.S. Pat. No. 5,766,819 is incorporated by reference herein. By providing an additional decomposition pathway for the creation of gaseous products, additional propulsive forces can be generated to assist in the transfer process.

Optionally, there may be a release means (not shown) provided between the heating layer (16), if present, or the support (14) and the thermally imageable layer (12). This may be accomplished by oxygen plasma treating the heating layer (16) or the support (14). Alternately, release layers may be applied to either the heating layer (16), if present, or the support (14) prior to application of the thermally imageable layer (12). Some useful layers include hexamethyldisilazane (HMDS) available from Arch Chemicals, Inc., Norwalk Conn., dichlorosilane perfluordecane, available from Gelest, Inc., Tullytown, Pa., tridecafluoro-1,1,2,2-tetrahydooctyl-1-methyldichlorosilane, available from United Chemical Technologies, Inc., Bristol, Pa., etc. Release means may also be a heat activated release material.

Other donor elements may comprise alternate thermally imageable layer or layers on a support. Additional layers may be present depending of the specific process used for imagewise exposure and transfer of the formed images. Some suitable thermally imageable layers over which the overcoat described above may be applied are disclosed in U.S. Pat. Nos. 5,773,188, 5,622,795, 5,593,808, 5,334,573, 5,156,938, 5,256,506, 5,427,847, 5,171,650 and U.S. Pat. No. 5,681,681.

Receiver Element

The receiver element, illustrated in FIG. 2, comprises a receiver support (22) and an image-receiving layer (24), and optionally a cushion or release layer (not shown).

The receiver support (22) can be made of the same materials as the base support of the donor element. In addition, opaque materials, such as polyethylene terephthalate filled with a white pigment such as titanium dioxide, or synthetic paper, such as Tyvek® spunbonded polyolefin may be used as the receiver support. Typical materials for the receiver support (22) are polyethylene terephthalate and polyimide. Alternately, when the receiver element is used as the permanent substrate, the receiver support may include transparent plastic films, as described above, glass, and composites thereof. Thin glass substrates (0.5-1.0 mm thick) are typically used.

The image-receiving layer (24) may be a coating of, for example, a polycarbonate; a polyurethane; a polyester; polyvinyl chloride; styrene/acrylonitrile copolymer; poly(caprolactone); vinylacetate copolymers with ethylene and/or vinyl chloride; (meth)acrylate homopolymers (such as butylmethacrylate) and copolymers; and mixtures thereof. This image-receiving layer may be present in any amount effective for the intended purpose. In general, good results have been obtained at coating weights of 1 to 5 g/m$^2$. Alternately, the image receiving layer may comprise a low molecular weight crosslinkable binder having a number average molecular weight of about 1,500 to about 70,000.

In addition to the image-receiving layer, the receiver element may optionally include one or more other layers between the receiver support and the image receiving layer.

One additional layer between the image-receiving layer and the support is a release layer. In the intermediate transfer process, where the receiver element is the intermediate transfer element, the release layer can provide the desired adhesion balance to the receiver element so that the image-receiving layer adheres to the receiver support during exposure and separation from the donor element, but promotes the separation of the image receiving layer from the receiver support upon transfer, for example by lamination, of the color image to a permanent support. The color image is thus between the permanent support (e.g., glass or polarizing element) and the image receiving layer. The image receiving layer can act as a planarizing layer for the LCD device. Examples of materials suitable for use as the release layer include polyamides, silicones, vinyl chloride polymers and copolymers, vinyl acetate polymers and copolymers and plasticized polyvinyl alcohols. The release layer can have a thickness in the range of 1 to 50 microns.

A cushion layer that is a deformable layer may also be present in the receiver element, typically between the release layer and the receiver support. The cushion layer may be present to increase the contact between the receiver element and the donor element when assembled. Examples of suitable materials for use as the cushion layer include copolymers of styrene and olefin monomers such as styrene/ethylene/butylene/-styrene, styrene/butylene/styrene block copolymers, and other elastomers. An adhesive layer may be present between the cushion layer and the release layer or between the cushion layer and the image receiving layer. Examples of suitable adhesives include hot melt adhesives such as ethylene vinyl acetate. Receiving elements suitable for use in color filter array applications are disclosed as transfer elements in U.S. Pat. No. 5,565,301 which is hereby incorporated by reference. Typical polymers for the receiver layer are (meth)acrylic polymers, including, but not limited to, acrylate homopolymers and copolymers, methacrylate homopolymers and copolymers, (meth)acrylate block copolymers, and (meth)acrylate copolymers containing other comonomer types, such as styrene. Alternate receiver elements are disclosed in U.S. Pat. No. 5,534,387. Alternately, the image receiving layer may also contain a low molecular weight crosslinkable binder similar to that described above.

Typically, the surface of the image receiving layer may be roughened to improve its function. Methods of roughening the surface of the image receiving layer include micro-roughening. Micro-roughening may be accomplished by any suitable method. One specific example, is by bringing it in contact with a roughened sheet typically under pressure and heat. The pressures used are preferably less than about 8 MPa. Optionally, heat may be applied up to about 80 to about 88° C. more typically about 54° C. for polycaprolactone polymers and about 94° C. for poly(vinylacetate) polymers, to obtain a uniform micro-roughened surface across the image receiving layer. Alternatively, heated or chilled roughened rolls may be used to achieve the micro-roughening.

It is important that the means used for micro-roughening of the image receiving layer has uniform roughness across its surface. Typically the average roughness (Ra) as determined with a Wyko Profilometer (Wyko Model NT 3300, Veeco Metrology, Tucson, Ariz.)) should yield values less than about 0.6µ.

Permanent Substrate

In the intermediate transfer process, the permanent substrate (30) used in step (3) of the process must be optically transparent. Some examples include transparent plastic films such as polyethylene terephthalate and polyimide, glass, treated glass and composites thereof, or rigid plastic such as polycarbonate or poly(4-methylpentene). Thin glass substrates (0.5-1.0 mm thick) may be typically used.

The treatment or coating on the permanent substrate (30) may be selected from the group consisting of a polycarbonate; a polyurethane; a polyester; polyvinyl chloride; styrene/acrylonitrile copolymer; poly(caprolactone); vinylacetate copolymers with ethylene and/or vinyl chloride; (meth)acrylate homopolymers (such as butyl-methacrylate) and copolymers; and mixtures thereof. This layer may be present in any amount effective for the intended purpose. In general, good results have been obtained at coating weights of 1 to 5 g/m$^2$.

In the direct transfer process, the receiver element in step (2) is the permanent substrate (30). The receiver support (22) and an optional image-receiving layer (24) comprise the materials described above for the permanent substrate (30) and the treatment or coating thereon.

It may also be advantageous to employ a substrate that incorporates a pre-formed black mask pattern. Typically, a pre-formed black mask is used in the case of rigid glass or plastic substrates, and also can be employed with flexible permanent substrates or even with flexible intermediate receiver supports. The black mask, which serves to delineate the colored (e.g. RGB) pixel structure of the color filter, may be prepared in various ways. One method of preparing the black mask may employ thermal imaging donors of the type described herein. In this case the process of constructing the black mask follows the processes described for imaging of the colored donor films to either intermediate or permanent substrates, with or without the optional image receiving layer.

It is also possible to use a black mask that is preformed on the permanent substrate by alternate conventional means well known to those skilled in the art. An example of a conventional method of producing a black mask is a photolithographic process involving optical exposure of a photoresist through an exposure mask. The black mask may be typically formed following additional processing steps (e.g. etching, washing, stripping, etc.). When employing a conventional pre-formed black mask, the colored thermal donor elements are exposed and transfer an image to the permanent substrate (30) with preformed black mask in precise alignment to the preformed black mask. This process results in an 'hybrid' color filter employing conventional black mask and thermal color pattern. The advantage of using a preformed black mask is that this process offers improved ease of integration into existing LCD manufacturing processes. The preformed black mask also takes advantage of the inherently much higher resolution of optical lithographic processes in comparison to the thermal transfer process. A high resolution black mask can serve to decrease the resolution requirement of the colored portions of the color filter pattern as the lower resolution edges of the color patterns are hidden by the black mask. Transfer of the colored donors in alignment with a preformed black mask may require modification of the thermal imaging equipment to allow a means for aligning the preformed black mask to the writing locations of the imager.

Typically a preformed conventional black mask pattern may be composed of either thin (ca. 0.1-0.3 microns) inorganic-materials (e.g. chromium, chromium oxide, etc.) or of organic black pigmented resist (organic black mask). In the case of an organic black mask, typical thicknesses of the black mask layer may be in the range of 0.5-3.0 microns.

Generally if the treatment or coating is present with a conventionally prepared preformed black mask, the treatment or coating will be the outermost layer of the permanent substrate (30) and will completely cover the preformed black mask.

Process

Figure 5A:
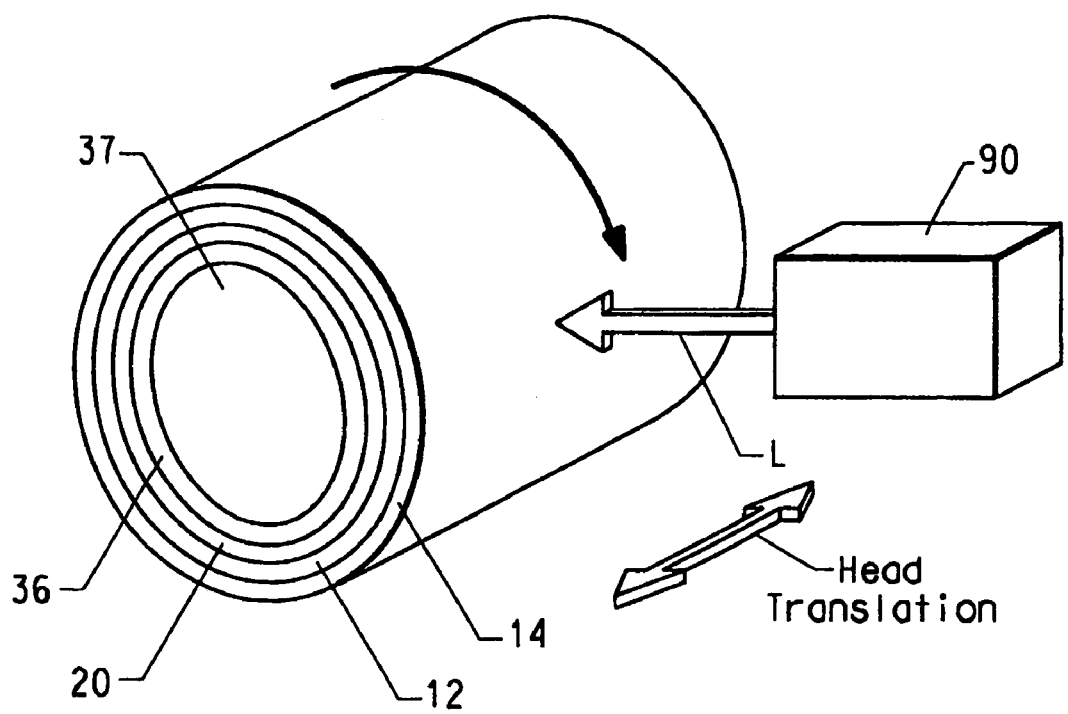
FIG. 5a is the layout of a drum type thermal imager.
Figure 5B:
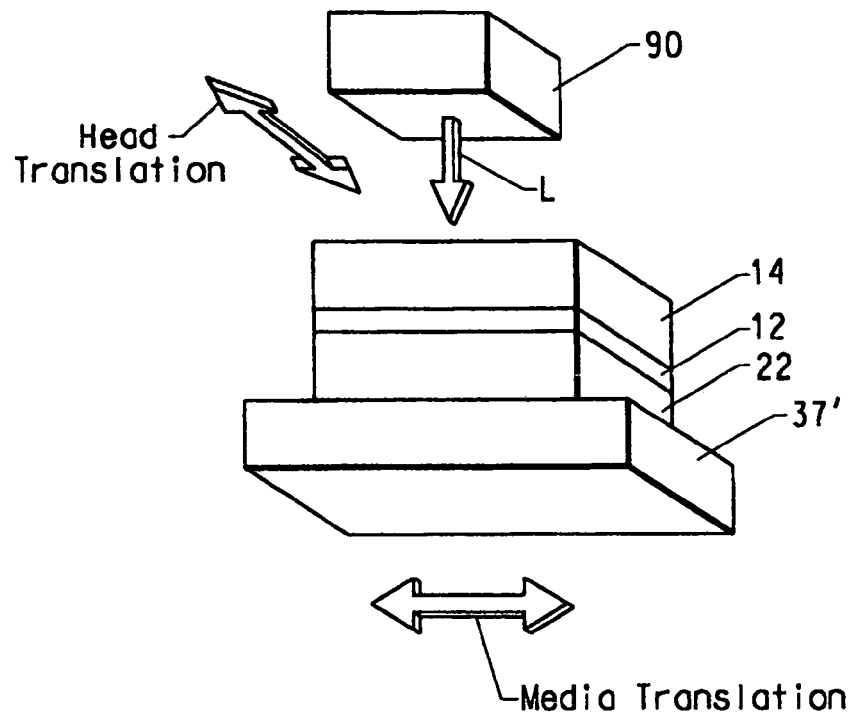
FIG. 5b is the layout of a flat bed thermal imager.
Figure 6:
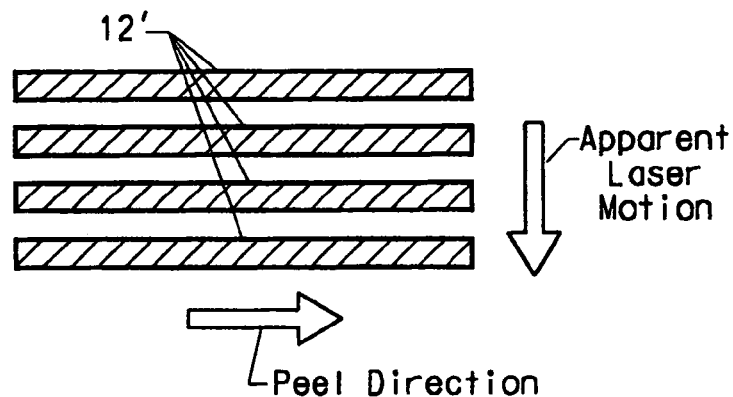
FIG. 6 shows the orientation of color stripes to the peel direction.

As shown in FIGS. 2, 5a and 5b, the outer surface of the thermally imageable layer (12) of the donor element (10) is brought into close proximity with the image receiving layer (24) of the receiving element (20) to form the assemblage (25). Vacuum and/or pressure can be used to hold the donor element (10) and the receiver element (20) together to form the assemblage (25). As another alternative, the donor element (10) and receiver element (20) can be taped together and taped to the imaging apparatus. A pin/clamping system can also be used. Alternatively, the surface of the donor element and or the receiver element may be roughened during coating by laminating a matte polyethylene coversheet. This serves improve the average uniformity of the contact between the donor element (10) and the receiver element (20), by facilitating the evacuation of air from between the donor element (10) and the receiver element (20).

The assemblage (25) is then exposed through the donor element (10) in selected areas by radiation (L) in the form of heat or light. As mentioned above, the exposure pattern is the desired pattern of the color filter. The optional heating layer (16) or the thermally imageable layer absorbs the radiation (L), generating heat which causes transfer of the heat-exposed portions of the thermally imageable layer (12) to the receiver element (20).

After exposure, the donor element (10) is separated from the receiver element (20). This may be done by peeling the two elements apart. Very little peel force is typically required; the donor support (10) may simply be separated from the receiver element (20). Any conventional manual or automatic separation technique may be used. Best quality imaging results are obtained when the process of separating the donor and receiver is performed with a consistent peel speed and radius of curvature with the direction of peeling oriented parallel to the color filter stripe pattern.

After separation of the donor element (10) and the receiver element (20), the color image is transferred to the receiver element, while the unexposed, unwanted portions of the thermally imageable layer (12) remain on the donor element, The radiation (L) is typically provided by a laser. Laser radiation may be provided at a laser fluence of up to about 1 J/cm$^2$, preferably about 75-500 mJ/cm$^2$ Other techniques that generate sufficient heat to cause transfer of the colorant material layer may be used, as well. For example, a thermal print head, or microscopic arrays of metallic tips with diameters ranging from about 50 nanometers, such as those used in atomic force microscopy, diameters ranging to about 5 microns, may also be used. An electric current is provided to the metallic tips to generate the heat.

Various types of lasers may be used to expose the thermally imageable layer (12) of colorant material. The laser preferably emits in the infrared, near-infrared or visible region. Particularly advantageous are diode lasers emitting in the region of 750 to 870 nm which offer a substantial advantage in terms of their small size, low cost, stability, reliability, ruggedness and ease of modulation. Diode lasers emitting in the range of 780 to 850 nm are most preferred. Such lasers are available from, for example, Spectra Diode Laboratories, San Jose, Calif. Other types of lasers may also be used, as is known in the art, providing that the absorption of the heating layer (16) matches the emitting wavelength of the laser.

As shown in FIG. 5a, if the donor element (10) and the receiver element (20) are both flexible, the assembly (25) can be conveniently mounted on a drum to facilitate laser imaging.

Figure 3:
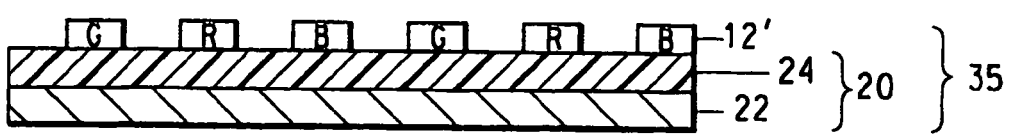
FIG. 3 illustrates the receiver element of FIG. 2 after exposure and separation from the donor element, wherein the receiver element comprises a receiver support, which may be glass, and carries a color image transferred from the thermally imageable layer of the donor element.
Figure 4:
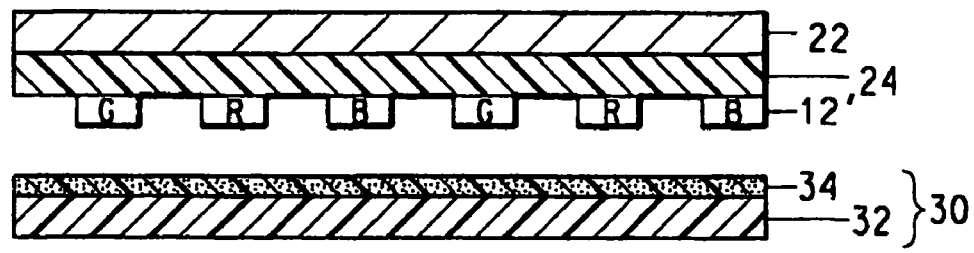
FIGS. 4 illustrates the receiver element of FIG. 2 after exposure and separation from the donor element, wherein the receiver element carries a color image transferred from the thermally imageable layer of the donor element, and the transfer of said color image to a permanent substrate.
Figure 7:
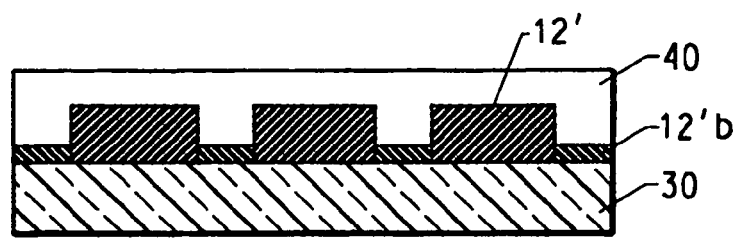
FIG. 7 shows schematic cross-section of the color filter pattern on glass showing the arrangement of the planarizing layer.

The transfer step can be repeated with the same receiver element bearing the first color image (12') and one or more different donor elements having a colorant of a different color, to prepare a multicolor color filter pattern. If the receiver support is the permanent substrate, this forms a color filter (35) as shown in FIG. 3 and FIG. 7. Optionally, an additional adhesive layer (not shown) may be present on the permanent substrate, e.g., glass, before transfer As best seen in FIG. 4, if the receiver element is an intermediate transfer element, the next step in the process of the invention is to transfer the color image (12') from the receiver element to a permanent substrate, such as glass. After formation of the color image (12'), which may be a single color or multicolor image, on the receiver element (20), the receiver element (20), including the color image (12'), is brought into contact with a permanent substrate (30), as shown in FIG. 4. The substrate (30) may include a base element (32) and an adhesive coating (34) to increase the adhesion of the patterned layer (12') to the substrate. The adhesive coating (34) may be a suitable polycarbonate, a polyurethane, a polyester, polyvinyl chloride, styrene/acrylonitrile copolymer, poly(caprolactone), vinylacetate copolymers with ethylene and/or vinyl chloride, (meth) acrylate homopolymers (such as butyl-methacrylate), copolymers, and mixtures thereof. Alternately, an image receiving layer similar to that described above, for the receiving element, may be applied to the permanent substrate, by laminating a separate receiving element to the permanent substrate and removing, e.g. peeling, the receiver support, prior to transferring the color image to the permanent substrate.

It is important that the surface of the substrate (30) adjacent the color image have greater adhesion to the color image (12') than the adhesion of the color image and image receiving layer to the receiver support. The substrate (30) may be any material that will support the subsequent layers and transmit light generated by LCD display. Some suitable materials include transparent plastic films, as described above, glass, and composites. Thin glass substrates are preferred. Glass as thin as 50 microns can be used. The upper limit on thickness is set by the weight and desired properties of the end product. The thickness is usually less than 5 millimeters. Typical values are from 0.5-1.0 mm.

Preferably, the color image (12') is transferred to the substrate (30) by lamination. Nip or press lamination may be used, as is known in the art. A roll-to-roll HRL-24 Laminator, manufactured by DuPont, Wilmington, Del., is typically used to accomplish the lamination. The minimum useful pressure is about 210 kPa. The maximum pressure is determined by the pressure at which unwanted contamination, such as a speck of dust, can cause the substrate to crack. Generally the pressure should be less than about 69 MPa. After separation of the donor element (10) from the substrate (30), the color image (12') is transferred to the substrate to form a color filter element (35).

The next step in the process of the invention is to apply a planarization layer (40) to the so formed color filter.

Figure 8:
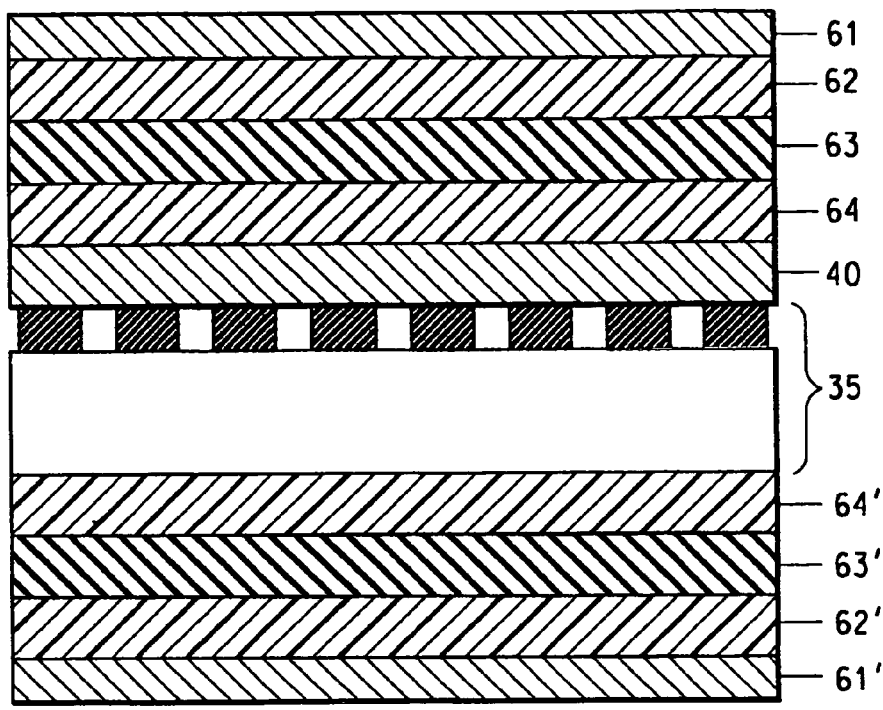
FIG. 8 is an illustration of the lamination stack used for lamination of the planarizing layer to the color filter in a press.
Figure 9:
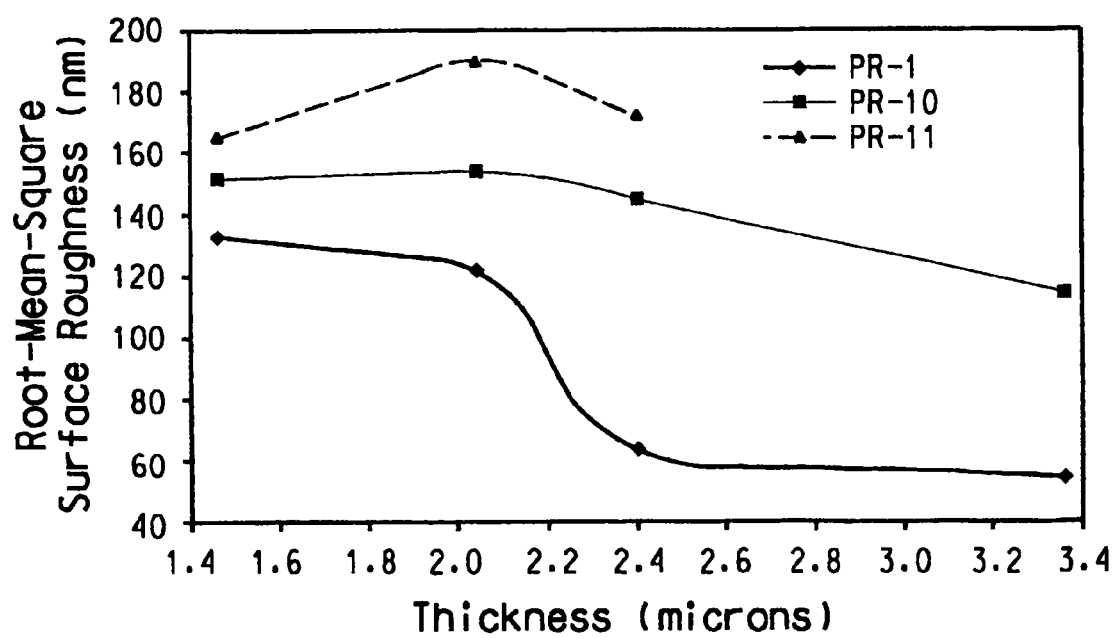
FIG. 9 is a comparison graph showing the effect of thickness and molecular weight on planarizing effectiveness

The planarization layer (40) may be applied using any conventional coating technique. Such techniques are well known in the art and include spin coating, casting, gravure printing, and extrusion coating processes. The planarization layer can also be applied as a preformed film and laminated to the color filter element (35) as shown in FIG. 8, wherein a stack comprising a rigid plate (61) such as a stainless steel plate; a release element (62) such as a Teflon® sheet; a flexible compressible element (63) such as a fiber reinforced rubber sheet; a polyester sheet (64); the planarizing element having a planarizing layer (40); color filter (35) with the color filter pattern adjacent the planarizing layer (40); a polyester sheet (64') adjacent the glass substrate of the color filter; a flexible compressible element (63') such as a fiber reinforced rubber sheet; a release element (62') such as a Teflon® sheet; and a rigid plate (61') such as a stainless steel plate; is placed in a vacuum laminator and the chamber evacuated before lamination of the planarizing layer to the color filter element (35) occurs.

Liquid Crystal Display

A simplified schematic representation of a liquid crystal display and color filter are shown in FIG. 1. The liquid crystal display comprises two panels. The upper panel comprises a first polarizer (71), a glass or other rigid substrate (30), an optional adhesion layer, a black matrix formed by either conventional lithographic techniques, via thermal printing or by other means. The materials comprising the black matrix may be either inorganic (e.g. chromium, chromium oxide, etc.) or organic (e.g. black pigmented photoresist). The upper plate further comprises the color filter layer comprising separate red, green and blue sub pixels (12'), a protective organic planarizing layer (40), a transparent electrical conductor (typically indium tin oxide) (73), and an alignment layer (74) which serves to template the liquid crystal orientation. The upper and lower plates are separated by rigid mechanical spacers (75) that maintain a fixed separation between the two plates and that further serve to define the cell wherein the liquid crystal solution is contained. The lower plate of the LCD display is comprised of a second alignment layer (76), transparent conductor (77) and glass or other rigid material as substrate (78) and finally a second polarizer (72). Not shown in the schematic diagram are the drive electronics that control the orientation of the liquid crystal. Typical modern LCD displays employ an array of thin film transistor circuits (not shown) (one circuit for each RGB sub-pixel) which are fabricated on the lower plate of the LCD display. Finally, a backlight (79) is located below the lower plate to provide illumination of the display. LCD displays employing reflected ambient illumination may also be used with the color filters of this invention.

EXAMPLES

These non-limiting examples demonstrate the processes and products claimed and described herein. All temperatures throughout the specification are in ° C. (degrees Centigrade) and all percentages are weight percentages unless indicated otherwise. Sigma-Aldrich, St. Louis, Mo., is a useful source of many of the materials used here.

Glossary:

| | |
|---|---|
| NIR-1 | 2-[2-[2-Chloro-3[2-(1,3-dihydro-1,1dimethyl-3-(4dimethyl-3(4sulfobutyl)-2H-benz[e]indol-2-yllidene)ethylidene]-1-cyclohexen-1-yl]ethenyl]-1,1-dimethyl-3-(sulfobutyl)-1H-benz[e]indolium, inner salt, (H. W. Sands Corp., Jupiter, FL) |
| FSA | Zonyl ® FSA fluoro surfactant; 25% solids in water and isopropanol, [CAS No. 57534-45-7] A lithium carboxylate anionic fluorosurfactant having the following structure: RfCH2CH2SCH2CH2CO2Li where Rf = F(CF2CF2)x and where x = 1 to 9 (DuPont, Wilmington, DE) |
| PEG 300 | Polyethylene glycol 300 [CAS No. 25322-68-3], 100%, Scientific Polymer Products, Inc., Ontario, NY) |
| Melinex ® 573 | 102 micron clear PET base (DuPontTeijinFilms ™, a joint venture of E. I. du Pont de Nemours & Company) |
| Creo Model 3244 Spectrum Trendsetter | Creo Inc., Vancouver, Canada |
| Wyko Model RST Plus Surface Profiler | Wyko Corp., Tucson, Arizona |
| Corning 1737 display grade glass | Corning Glass Company, Corning, NY |
| VAZO ® 67 | DuPont, Wilmington, DE |
| CRONAR ® 471X | DuPont, Wilmington, DE |
| ELVAX ® 550 | DuPont, Wilmington, DE |
| POLYSTEP B-7 | Stepan Co., Northfield, IL |
| Butyl Cellosolve [111-76-2] | Aldrich, Milwaukee, WI |
| 2-amino-2-methyl-1-propanol [124-68-5] | Aldrich, Milwaukee, WI |
| N,N-dimethylethanolamine (DMEA) [108-01-0]] | Aldrich, Milwaukee, WI |

DEFINITIONS

Tg (Glass transition temperature) values reported were mid-point temperatures in degrees Centigrade from DSC scans recorded according to ASTM D3418-82.

Molecular weights were measured by standard gel permeation chromatography (GPC) by standard techniques vs. poly(methyl methacrylate) standards in THF solution.

Dynamic light scattering was performed using Brookhaven Instrument BI-9000AT digital correlator (Brookhaven Instruments, Brookhaven, N.Y.). An argon-ion laser with wavelength 488 nm and power 200 mW was used. Measurements were made at room temperature with scattering angle 60°. The samples were diluted 200 μL into 20 mL water then again 100 μL into 20 mL water, and then filtered with 0.45 micron filter. The results are reported as diameter (particle size) in nm units. For general discussions of the determination of particle sizes by quasielastic light scattering, see Paint and Surface Coatings: Theory and Practice, ed. By R. Lombourne, Ellis Horwood Ltd., West Sussex, England, 1987, pp. 296-299, and The Application of Laser Light Scattering to the Study of 35 Biological Motion, ed. By J. C. Earnshaw and M. W. Steer, Plenum Press, NY, 1983, pp. 53-76.

Solids content was measured by putting about 5 grams of acrylic latex in a tared, 5-cm aluminum pan, which was placed in a 75° C. vacuum oven at about 400 mm Hg vacuum for 1 to 2 days. Percent solids was calculated by dividing the final sample weight by the initial sample weight.

Coating weights were measured by cutting out and weighting a 1 dm² piece of film, removing the coating by rubbing with a paper towel moistened in either methanol or acetone, drying the film for several minutes, and reweighing. Coating weights are the difference in weights of the before and after film in mg, units: mg/dm².

Color Filter Preparation

Receiver Latexes

PR-8

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 140.0 grams methyl methacrylate, 4.0 grams glycidyl methacrylate, and 50.0 grams n-butyl acrylate was prepared and placed in the addition funnel. A second monomer blend of 140.0 grams methyl methacrylate, 4.0 grams glycidyl methacrylate, 50.0 grams n-butyl acrylate, and 12.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-8.

The acrylic latex had a particle size of 92 nm, 33.5% solids, and a $T_g$ of 72° C.

PR-9

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 110.0 grams methyl methacrylate, 4.0 grams glycidyl methacrylate, and 80.0 grams n-butyl acrylate was prepared and placed in the addition funnel. A second monomer blend of 110.0 grams methyl methacrylate, 4.0 grams glycidyl methacrylate, 80.0 grams n-butyl acrylate, and 12.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature, and filtered through a fine paint strainer, (Paul N. Gardner Company, Inc. Pompano Beach, Fla., Item number ST-F 60×48 mesh) to provide the acrylic latex PR-9.

The acrylic latex had a particle size of 94 nm, 33.4% solids, and a $T_g$ of 39° C.

Receiver Film

A receiver film (FR-1) was prepared as follows. A coating composition was prepared in a 40-Liter stainless steel vessel with the following ingredients: 3241.69 grams of deionized water, 144.08 grams of Zonyl® FSA, 2161.13 grams of Butyl Cellosolve, 9148.78 grams of PR-8, and 21323.13 grams of PR-9, added to the vessel in the stated order. The composition was coated to a dry coating weight of 13.1 mg/dm² on a supporting base. The coating composition was coated on the Elvax® 550 surface of a supporting base of 64 micron thick Elvax® 550 (ethylene vinyl acetate copolymer, DuPont) coated onto 102 micron thick Cronar® 471X polyester (DuPont, Wilmington, Del.). The coated supporting base was dried at temperatures which increased from an initial value of about 38° C. to a final value of about 65° C. over a period of about 5 minutes. After the film was dried, it was interleaved with OSM matte polyethylene film (Tredegar Co., New Bern, N.C.) and run at ambient temperature through nip rolls at 650 kPa to emboss the polyethylene pattern onto the receiver surface. The polyethylene film was left on the receiver surface until just prior to imaging to prevent contamination of the coated surface during subsequent handling.

Donor Element

Dispersing Resin DR-3

Pigment dispersant DR-3 was prepared by the cobalt chain transfer graft copolymer methods as described in U.S. Pat. No. 5,231,131, Chu, et. al. The composition is listed in Table 1. The composition before the —g— was polymerized by cobalt chain transfer polymerization to an oligomer with a polymerizable group at the end. This oligomer was then copolymerized with the remaining monomer mixture to form a graft copolymer.

TABLE 1

Composition information for DR-3.

| Dispersing Resin | Polymer Components | Monomer Composition | Solvent |
|---|---|---|---|
| DR-3 | (69)nBA/MA/AA-g-(31)MMA/MAA | (45.5/45.5/9)-g-(28.75/71.25) | Methyl ethyl ketone/isopropanol |

Pigment Dispersions

The PD-K1 pigment dispersion was prepared from Degussa W6620 carbon black and DR-3. The pigment dispersion was prepared at 15% solids with a pigment to dispersant ratio (P/D) of 2.0, according to the procedures described in U.S. Pat. No. 5,231,131, Chu: A mixture of 323.08 grams of water, 33.30 grams of dispersant solution, and 3.62 grams of 2-amino-2-methyl-1-propanol was charged, along with 10 40.00 grams of Degussa W6220 carbon black, to an attritor (Apollo® Trick Titanium, Troy, Mich.). The attritor contained 850 grams of 0.8-1.0 micron zirconia media. The mixture was processed for 22 hours, keeping the temperature below 38° C. Filtration through a 1 micron filter produced the pigment dispersion.

Dispersions PD-R5, PD-G4 and PD-B2 were prepared in the same manner as PD-K1 using the materials and conditions shown in Table 2.

TABLE 2

Compositions of Pigment Dispersions

| Pigment Dispersion | Pigment | Pigment Designation | P/D |
|---|---|---|---|
| PD-R5 | Chromophthal Red 3B (Ciba) | Pigment Red 177 | 2.0 |
| PD-G4 | Irgalite Green 6G (Ciba) | Pigment Green 36 | 8.0 |
| PD-B2 | Irgalite Blue GLO (Ciba) | Pigment Blue 15:3 | 4.0 |
| PD-K1 | W6220 (Degussa) | Carbon Black | 2.0 |

Binder Resins

PR-5

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 90.0 grams methyl methacrylate, 4.0 grams glycidyl methacrylate, and 100.0 grams n-butyl acrylate was prepared and placed in the addition funnel. A second monomer blend of 90.0 grams methyl methacrylate, 4.0 grams glycidyl methacrylate, 100.0 grams n-butyl acrylate, and 12.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85°0 C. plus or minus 3° C. was maintained for 30 minutes after the completion of the addition of the initiating solution.

Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-5.

The acrylic latex had a particle size of 81 nm, 33.3% solids, and a $T_g$ of 113° C.

PR-6

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.20 grams ammonium persulfate dissolved in 100 mL of deionized water was prepared. A first monomer blend of 10.0 grams methyl methacrylate, 20.0 grams styrene, 4.0 grams glycidyl methacrylate, and 160.0 grams n-butyl acrylate was prepared and placed in the addition funnel. A second monomer blend of 10.0 grams methyl methacrylate, 20.0 grams styrene, 4.0 grams glycidyl methacrylate, 160.0 grams n-butyl acrylate, and 12.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-6.

The acrylic latex had a particle size of 81 nm, 33.7% solids, and a Tg of −21° C.

Coating/Drying Conditions

Donor film formulations are summarized in Table 3. The amounts of materials listed Table 3 were added to a stirred 40-L stainless steel vessel under air in the order listed in Table 3. The formulations were then stirred for 24-48 hours and filtered through a 5μ filter. These formulations were coated onto the specified film bases and dried at temperatures that increased from an initial value of about 38° C. to a final value of about 65° C. over about 5 minutes.

TABLE 3

Gram Weights of Ingredients for Color Filter Donor Coating.

| Ingredient | Red | Green | Blue | Black |
|---|---|---|---|---|
| Deionized Water | 3942.00 | 4032.00 | 3960.00 | 3882.60 |
| Zonyl ® FSA | 14.40 | 34.20 | 14.40 | 43.20 |
| PR-5 | 2754.00 | 2538.00 | 2448.00 | 2754.00 |
| PR-6 | 302.40 | 446.40 | 613.80 | 446.40 |
| DMEA, 10% in water | 109.80 | 106.20 | 109.80 | 109.80 |
| PEG-300 | | 54.00 | | |
| NIR-1 | | 54.00 | 39.60 | 54.00 |
| PD-R5 | 10818.00 | | | |
| PD-G4 | | 10764.00 | | |
| PD-B2 | | | 10800.00 | |
| PD-K1 | | | | 10764.00 |

Imaging

Color donors were imaged on the Trendsetter® in the order R, B, G, K directly onto the receiver sheet. The power settings (Wpower, watts) were: R=6.35, B=7.20, G=5.45, K=5.90. The drum speeds (rpm) were: R=108, B=120, G=110, K=120.

The image used for preparation of the color filter was composed of alternating R/G/B stripes with widths of 110 microns. The stripes were separated by gaps of 10 microns. A black grid was overprinted on the color stripes; the width of the black lines was 30 microns and hence a 10-micron portion of the black grid overlapped each color stripe on either side of the gap between stripes. The black grid had a pitch of 200 microns in the direction orthogonal to the color stripes. Each color filter image was 13 cm square, and there were twelve images per receiver sheet.

Lamination of Filter to Glass

Glass Preparation

Pieces of Corning 1737 display grade glass (18 cm square) were rinsed with deionized water, rinsed and gently scrubbed with soapy water (Micro® brand cleaner), rinsed with deionized water, rinsed with isopropanol, rinsed with deionized water, and then dried vertically in a stream of dry nitrogen at room temperature.

Glass Treating Polymer, AP-1

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 66.0 grams methyl methacrylate, 4.0 grams glycidyl methacrylate, and 110.0 grams n-butyl acrylate was prepared and placed in the addition funnel. A second monomer blend of 66.0 grams methyl methacrylate, 4.0 grams glycidyl methacrylate, 110.0 grams n-butyl acrylate, and 40.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, AP-1.

The acrylic latex had particle size 88 nm, 33.5% solids, and $T_g$ 4° C.

Lamination of Color Filters to Glass

The polymer, AP-1, was diluted to 5% solids with water containing 6% butyl cellosolve. This coating mixture was coated onto the prepared glass samples with a spin coater at 1000 rpm. The coated glass was dried at room temperature for 24 hours. The thickness of the adhesive coating was 150 nm. Thickness was measured by scratching a small area to bare glass and measuring thickness with the Wyko. The individual color filters were laminated to the adhesive-coated glass samples in a Tetrahedron Model MTP13 laminator at 80° C. for three minutes and 7 megapascals pressure. The laminated color filters were allowed to cool to room temperature and then the backing film was peeled off.

Planarizer Film Preparation

Chain Transfer Agent Solution CTA-1

A chain transfer agent solution used in the following acrylic latex synthesis was prepared as described by the methods of U.S. Pat. No. 5,362,826, Berge, et. al. and U.S. Pat. No. 5,324,879, Hawthorne.

A 500-liter reactor was equipped with a reflux condenser and nitrogen atmosphere. The reactor was charged with methyl ethyl ketone (42.5 kg) and isopropyl-bis(borondifluorodimethylglyoximato) cobaltate (III) (Co III DMG) (104 g) and the contents brought to reflux. A first mixture of Co III DMG (26.0 g), methyl methacrylate (260 kg), and methyl ethyl ketone (10.6 kg) was added in a first feed to the reactor at a constant rate over a total period of 4 hours. Starting at the same time as the start of the first feed, a second mixture of VAZO® 67 (5.21 kg) and methyl ethyl ketone (53.1 kg) was added in a second feed to the reactor at a constant rate over a total period of 5 hours. After the completion of the second feed in 5 hours, the reactor contents were kept at reflux for a further 30 minutes. After cooling to ambient temperature, a 70 wt % solids solution of the chain transfer agent, CTA-1, was obtained.

PR-1

An acrylic latex of controlled molecular weight polymer resin was prepared as detailed below using the chain transfer agent solution according to the method in U.S. Pat. No. 5,773,534, Antonelli, et. al.

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 122 grams methyl methacrylate, 4.0 grams glycidyl methacrylate, 60.0 grams n-butyl acrylate and 8.0 grams chain transfer agent solution was prepared and placed in the addition funnel. A second monomer blend of 122.0 grams methyl methacrylate, 4.0 grams glycidyl methacrylate, 60 grams n-butyl acrylate, 12.0 grams of methacrylic acid and 8.0 grams chain transfer agent solution was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-1.

Properties of this latex are summarized in Table 3.

PR-10

An acrylic latex, PR-10 of controlled molecular weight polymer resin was prepared as detailed below using the chain transfer agent solution according to the method in U.S. Pat. No. 5,773,534, Antonelli, et. al.

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 126.0 grams methyl methacrylate, 4.0 grams glycidyl methacrylate, 60.0 grams n-butyl acrylate and 4.0 grams chain transfer agent solution was prepared and placed in the addition funnel. A second monomer blend of 126.0 grams methyl methacrylate, 4.0 grams glycidyl methacrylate, 60 grams n-butyl acrylate, 12.0 grams of methacrylic acid and 4.0 grams chain transfer agent solution was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, PR-10.

Properties of this latex are summarized in Table 3.

PR-11

An acrylic latex E99339-71 of controlled molecular weight polymer resin was prepared as detailed below using the chain transfer agent solution according to the method in U.S. Pat. No. 5,773,534, Antonelli, et. al.

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 128.0 grams methyl methacrylate, 4.0 grams glycidyl methacrylate, 60.0 grams n-butyl acrylate and 2.0 grams chain transfer agent solution was prepared and placed in the addition funnel. A second monomer blend of 128.0 grams methyl methacrylate, 4.0 grams glycidyl methacrylate, 60 grams n-butyl acrylate, 12.0 grams of methacrylic acid and 2.0 grams chain transfer agent solution was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex E99339-71.

Properties of this latex are summarized in Table 4.

TABLE 4

PROPERTIES OF PLANARIZING LATEXES
Summary of Planarizing Latex Properties

| Latex | % CTA-1 | Tg (° C.) | Particle Diameter (nm) | Mn, Mw |
|---|---|---|---|---|
| PR-1 | 4 | 55 | 86 | 20,000, 85,000 |
| PR-10 | 2 | 60 | 91 | 26,000, 118,000 |
| PR-11 | 1 | 60 | 91 | 22,000, 149,000 |

Lamination of Planarizer

Each of the three planarizing latexes was coated onto Melinex® 574 (DuPont) at four thicknesses as follows: A coating composition was prepared from each planarizing latex by mixing, in order, 4.50 grams of latex, 4.76 grams of water, 0.70 grams of butyl cellosolve, and 0.040 grams of Zonyl® FSA. Each coating composition was then coated onto four pieces of Melinex® 574 with #6, #8, #10, and #13 Meyer rods. The coated films were then air dried at ambient temperature for at least 24 hours before use. Thicknesses of the #6, #8, #10, and #13 rod coatings were determined to be 1.46, 2.07, 2.41, and 3.36 microns, respectively. Thicknesses of the planarizer layers were measured by laminating some of the film to a microscope slide, pretreated with an adhesive layer, scratching the resulting film to bare glass, and measuring thickness on Wyko Model RST Plus Surface Profiler (Wyko Corp., Tucson, Ariz.).

The planarizing films were then each placed coated side down on a color filter on glass and then laminated in the Tetrahedron press laminator at 130° C. for three minutes at 14 megapascals pressure. The planarized color filters were then cooled to room temperature before the Melinex® was peeled off. The planarized color filters were then annealed in a vacuum oven at 150° C. for 90 minutes.

Surface Roughness Measurements

Wyko Measurements

The roughness of the samples was measured with the Wyko optical profilometer. The root-mean-square (RMS) roughness, Rq (nm), was measured at five locations on each sample: center, left and right edges, and left and right bottom corners. The results were then averaged, and are summarized in Table 5.

TABLE 5

RMS surface roughness (Rq, nm) for planarized samples

| Coating Rod | Thickness | PR-1 | PR-10 | PR-11 |
|---|---|---|---|---|
| #6 | 1.46 | 134 | 151 | 165 |
| #8 | 2.07 | 122 | 153 | 189 |
| #10 | 2.41 | 65 | 145 | 171 |
| #13 | 3.36 | 53 | 114 | — |

What is claimed is:

1. A method for making a color image comprising:
   (1) imagewise exposing to laser radiation a laserable assemblage comprising:
      (A) a donor element comprising a thermally imageable layer, and
      (B) a receiver element comprising:
         (a) a receiver support; and
         (b) an image receiving layer provided on the surface of the receiver support; whereby the exposed areas of the thermally imageable layer are transferred to the receiver element to form a colorant-containing image on the image receiving layer; and
   (2) separating the donor element (A) from the receiver element (B), thereby revealing the colorant-containing image on the image receiving layer of the receiver element;
   (3) optionally applying the colorant-containing image on the image receiving layer of the receiver element to a permanent substrate, and removing the receiver support to transfer the colorant-containing image on the image receiving layer to the permanent substrate, and
   (4) applying a planarizing element comprising a support and a planarizing layer to the image receiving layer, and removing the support, wherein the planarizing layer is adjacent the colorant-containing image, and wherein the planarizing layer comprises a crosslinkable binder having a weight average molecular weight of about 20,000 to about 110,000.

2. The method of claim 1 wherein the crosslinkable binder has a weight average molecular weight of about 30,000 to about 100,000.

3. The method of claim 2 wherein the crosslinkable binder has a weight average molecular weight of 50,000 to about 85,000.

4. The method of claim 1 wherein the thermally imageable layer, image receiving layer or both comprise a crosslinkable binder having a number average molecular weight of about 1,500 to about 70,000.

5. The method for making a color image of claim 1 wherein step (3) is optional, and the receiver support is a transparent material.

6. The method for making a color image of claim 1 wherein permanent substrate is a transparent material.

7. The method for making a color image of claim 5 or 6 wherein transparent material is glass.

8. The method for making a color image of claim 5 or 6 wherein transparent material is treated glass.

9. The method for making a color image of claim 5 or 6 wherein the transparent material is a rigid plastic.

10. The method for making a color image of claim 9 wherein the rigid plastic is polycarbonate.

11. The method for making a color image of claim 1 wherein the crosslinkable binder is a polymer prepared by emulsion polymerization or solution polymerization.

12. The method for making a color image of claim 11 wherein the crosslinkable binder is prepared from monomers selected from the group consisting of acrylic acid and esters, methacrylic acid and esters, and styrene.

13. The method for making a color image of claim 7 wherein the applying is by laminating.

14. A method for making a color image comprising:
   (1) imagewise exposing to laser radiation a laserable assemblage comprising:
      (A) a donor element having a thermally imageable layer, and
      (B) a permanent substrate; whereby the exposed areas of the thermally imageable layer are transferred to the permanent substrate to form a colorant-containing image on the permanent substrate;
   (2) separating the donor element (A) from the permanent substrate (B), thereby revealing the colorant-containing image on the permanent substrate, and
   (3) applying a planarizing element comprising a support and a planarizing layer to the colorant-containing image, and removing the support, wherein the planarizing layer is adjacent the colorant-containing image, and wherein the planarizing layer comprises a Gliosslinkable binder having a weight average molecular weight of about 20.000 to about 110,000.

15. The method of claim 14 wherein the crosslinkable binder has a weight average molecular weight of about 30,000 to about 100,000.

16. The method of claim 15 wherein the crosslinkable binder has a weight average molecular weigh of 50,000 to about 85.000.

17. The method for making a color image of claim 14 wherein permanent substrate is a transparent material.

18. The method for making a color image of claim 17 wherein transparent material is glass.

19. The method for making a color image of claim 17 wherein transparent material is treated glass.

20. The method for making a color image of claim 17 wherein the transparent material is a rigid plastic.

21. The method for making a color image of claim 20 wherein the rigid plastic is polycarbonate.

* * * * *

UNITED STATES PATENT AND TRADEMARK OFFICE
CERTIFICATE OF CORRECTION

PATENT NO. : 7,234,398 B2
APPLICATION NO. : 10/511854
DATED : June 26, 2007
INVENTOR(S) : Jonathan V Caspar et al.

It is certified that error appears in the above-identified patent and that said Letters Patent is hereby corrected as shown below:

Column 16, line 65 – Delete the "35".

Column 20, line 11 – Delete the boldface "0".

Column 26, line 8 claim 1 – Change "oolorano-oontaining" to read
-- colorant-containing --.

Column 27, line 1 claim 14 – Change "Gliosslink-" to read -- Crosslink- --.

Signed and Sealed this

Eighteenth Day of March, 2008

JON W. DUDAS
*Director of the United States Patent and Trademark Office*